Nov. 10, 1925.
A. A. QUICK
1,561,021
CHAIN HOIST
Filed Sept. 12, 1922
2 Sheets-Sheet 1
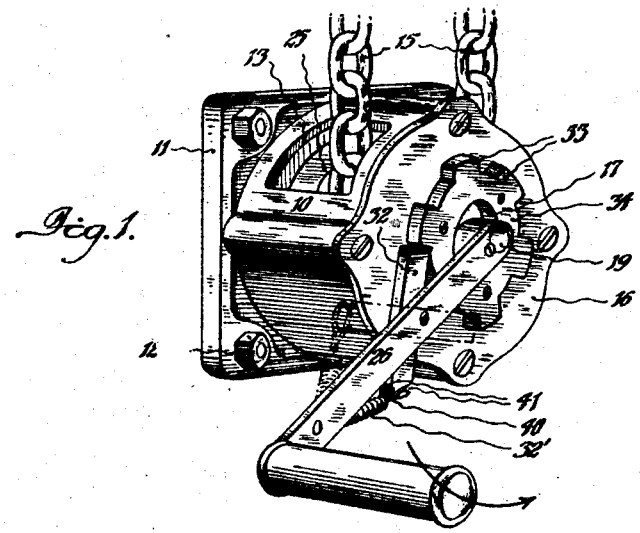
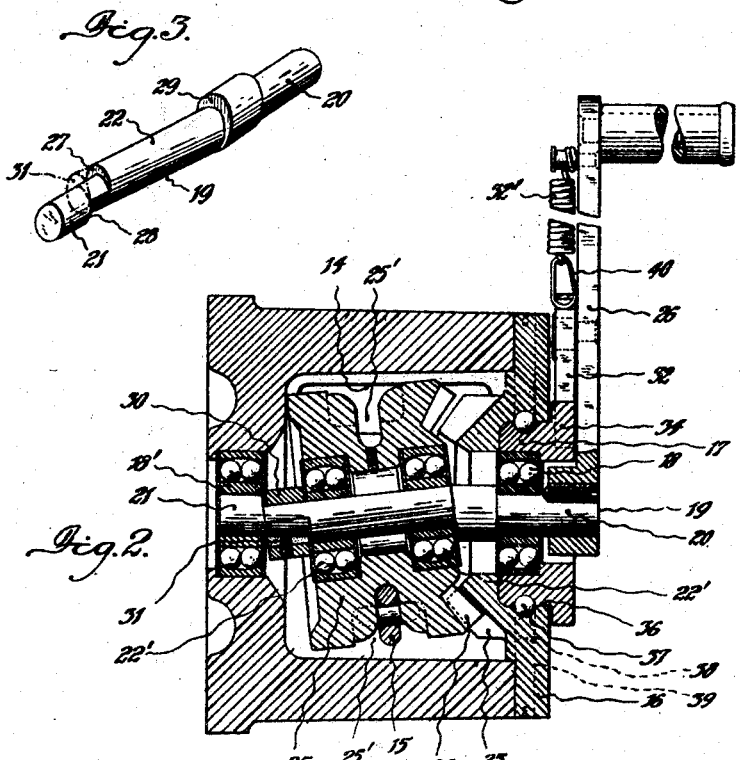
Inventor
A. A. Quick
By Marker Clerk
Attorneys Nov. 10, 1925.
A. A. QUICK
1,561,021
CHAIN HOIST
Filed Sept. 12, 1922   2 Sheets-Sheet 2
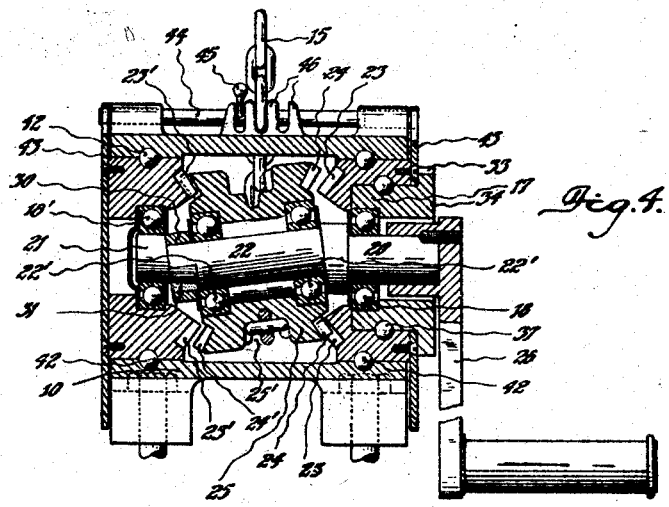
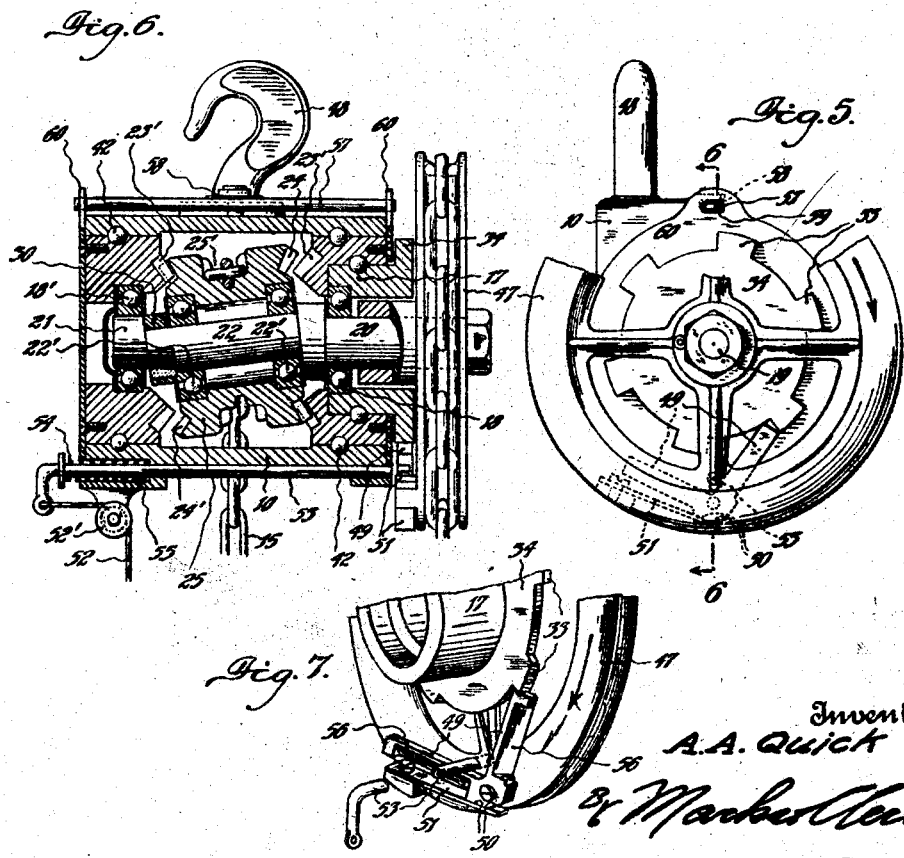
Inventor
A. A. Quick
By Marker Clark
Attorneys Patented Nov. 10, 1925.

1,561,021

UNITED STATES PATENT OFFICE.

ALFRED ARTHUR QUICK, OF THORNBURY, VICTORIA, AUSTRALIA.

CHAIN HOIST.

Application filed September 12, 1922. Serial No. 587,800.

*To all whom it may concern:*

Be it known that ALFRED ARTHUR QUICK, a subject of the King of Great Britain, residing at 75 Penders Street, Thornbury, in the State of Victoria, Commonwealth of Australia, has invented certain new and useful Improvements in and Connected with Chain Hoists, of which the following is a specification.

This invention relates to improvements in and connected with chain hoists and refers especially to hoists, pulley blocks, winches and like devices of the type embodying epicyclic gearing and having a nutating or oscillating load chain wheel.

Hitherto, in gearing of the above type it has been customary to key the load chain wheel on a slow moving shaft or to mount it rotatively on a stationary spindle or sphere and to operate the same through suitable mechanism from a driving or high speed shaft. This construction necessitates the use of two shafts or spindles (in most cases arranged concentrically with each other) which are so arranged as to render it difficult or impossible to manufacture a hoist in a compact form. The disadvantage incidental to chain hoists of the above type is that the introduction of ball or roller bearings to reduce friction between the surfaces of moving parts unduly increases the size thereof and in the case of pulley blocks necessitates an increase in head-room.

Now the object of the present invention is to provide a chain hoist of compact construction wherein ball or roller bearings can be utilized throughout without unduly increasing the size thereof and whereby the same will operate with a maximum efficiency from the expenditure of a minimum of power and whereby it will permit of variation in speed and reversal of direction of rotation as may be required.

I accomplish the above-mentioned object by providing a chain hoist wherein inter alia a load chain wheel is mounted to rotate on ball bearings carried on an angularly disposed portion of an axle having co-axial end portions and means for effecting the rotation thereof whereby a nutating or oscillating motion is imparted to the said load chain wheel and gear teeth thereon will mesh with and roll around a fixed ring of internal bevel teeth.

The invention also embodies an automatically controlled friction brake comprising a sleeve mounted to rotate within the fixed ring of bevel teeth and carrying a ball bearing for the adjacent end of the axle, and a spring actuated reversible pawl adapted to mesh with ratchet teeth on the sleeve whereby when the means for effecting the rotation of the axle is in operation in one direction the axle will rotate freely in the ball bearing and when operating in the reverse direction the pawl will lock the sleeve to the axle and the frictional resistance between the opposed surfaces of the said sleeve and the seating therefor will hold the load.

Other salient features of the invention reside in the provision of means for varying the speeds and of compensating means for enabling an equal distribution of the stresses when two sets of gears are used in the invention.

In order that the invention may be readily understood reference will now be had to the accompanying sheets of explanatory drawings wherein Figure 1 is a view in perspective of a simple form of lever operated hoist constructed in accordance with the invention.

Figure 2 is a view in sectional elevation of a hoist similar to that shown in Figure 1.

Figure 3 is a view in perspective of an axle for supporting the nutating or oscillating wheel.

Figure 4 is a view in sectional side elevation of a modified form of hoist adapted for obtaining different variations in speeds.

Figure 5 is a view in end elevation of a further modified form of pulley block embodying the improvements comprised in the invention, portion being shown broken away for convenience of illustration.

Figure 6 is a view in sectional side elevation taken on the dotted line 6—6 of Figure 5.

Figure 7 is a view in perspective of a detail in the construction of pulley block shown in Figures 5 and 6.

Referring to Figures 1 to 3 of the drawings, the numeral 10 designates a casing which is provided at one end with a flange 11 adapted to take bolts 12 for securing the said casing to a wall or other suitable support.

The casing is formed with openings 13 and 14 in its circumference through which a load hauling chain 15 or rope is admitted and emitted. One end of the casing 10 is partially closed by an inwardly projecting flange and the opposite end is provided with a removable annular cap 16 which forms a seating for a sleeve 17 having a housing for a ball bearing 18 fitted centrally therein. The closed end of the casing is provided with a centrally disposed ball bearing 18' and the said ball bearings 18 and 18' are adapted to support a rotating axle 19.

The axle 19 is formed with co-axial end portions 20 and 21 and with a central portion 22 the axis of which is arranged at an acute angle to the axis of the said end portions.

The removable annular cap 16 is formed on its inner face with a ring or series of bevel gear teeth 23 a predetermined number of which are adapted to mesh with a ring or series of internal bevel teeth 24 upon the adjacent face of a load chain wheel 25 which is carried by ball bearings 22' mounted on the central portion of the axle.

The load chain wheel is provided with circumferentially disposed pockets 25' for accommodating the links of the load hauling chain 15 and its side remote from the ring of teeth 24 is adapted to roll upon the end of the casing adjacent thereto to take the back thrust of the intermeshing gear teeth.

The amount of inclination of the central portion 22 of the axle determines the angular disposition of the load chain wheel and the number of teeth 23 and 24 which are in mesh at the same time.

The pitch cone apex of the fixed ring bevel teeth 23 and the pitch cone apex of the internal bevel teeth 24 on the load chain wheel meet at a common centre or point which is at the point of the intersection of the axis of the central portion 22 and axis of the end portions of the axle.

The end 20 of the axle projects beyond the annular cap 16 and is fitted with a crank handle 26 for imparting rotation to the said axle. Portion of the axle between the end part 21 and the angularly disposed central part 22 is reduced as shown in the drawings and one side of this reduced portion is parallel to the axis of the said end part 21 and the opposite side is parallel to the axis of the said central part. This reduced portion is effected in the turning of the axle in a lathe and produces shoulders 27 and 28 on opposite sides thereof.

In assembling the parts carried by the axle and the bearings therefor the right hand bearing 22' is passed over the end portion 21 until it bears against the shoulder 27 when it is moved laterally into alignment with the central portion. This bearing is moved over the central portion until it bears against a collar or shoulder 29 formed on the axle between the end portion 20 and the central part 22 when the load chain wheel is moved into position over the said bearing. The said load chain wheel is formed with a central bore of sufficient diameter to ensure it passing freely over the axle.

The left hand bearing 22' for the load chain wheel is then moved into position on the axle as above described and the said wheel is retained in position on the axle by means of a ring 30 which is secured fixedly between the shoulders 27 and 28 by means of a tapered filling piece 31 of suitable material. The tapered filling piece 31 is crescent shaped in cross section and completely fills the space between the ring and the reduced part of the axle.

A spring actuated reversible pawl 32 is pivoted to the crank handle 26 and its engaging end is adapted to mesh with teeth 33 formed on a flange 34 of the sleeve 17 which is rotatively supported within a correspondingly shaped seating 36 formed concentrically in the annular cap 16. The sleeve is retained within its seating by a series of balls 37 which are inserted into a race formed between the opposed faces of the two parts through a hole 38 normally filled by a screw 39.

The ball bearing 18 is fitted centrally within a housing in the sleeve and when the crank handle is turned in the direction of the arrow shown in Figure 1 to raise a load the axle 19 will rotate freely in the bearing 18. When the crank handle is rotated in the reverse direction (whether by operating the crank handle or under the influence of the load on the chain 15) the pawl 32 will engage with one of the teeth 33 on the flange of the sleeve 17 and thereby lock the said axle to the sleeve. When the crank handle is locked to the axle as above described the friction between the contiguous surfaces of the sleeve and the seating for the same offers considerable resistance to the movement of the crank handle and axle in a reverse direction and thereby acts as a brake to prevent the load being lowered.

The pawl 32 can be adjusted to lock the sleeve 17 to the axle when the crank handle is operated in either a right or left hand direction so as to ensure the parts functioning as a brake when the crank handle is rotated. Thus it will be understood that a load can be attached to either end of the chain 15 and the crank handle operated in a clockwise or anticlockwise direction to raise the load and that the reversible pawl can be disposed to suit the direction of operation of the said crank handle. The spring 32' acting on the pawl 32 is connected at one end to the crank handle and its opposite end is formed with a loop 40 which is engaged by notches 41 formed in opposite sides of the outer end of said pawl. The loop 40 and the notches 41 permit of an operative connection between the two parts to suit the direction of operation of the load chain wheel.

In operation the axle is rotated by means of the handle causing the axis of the load chain wheel to describe a conical path and the ring or series of internal bevel teeth on said wheel to roll upon the fixed ring or series of teeth. By reason of the fact that there are more teeth in the ring or series of teeth upon the load chain wheel than in the ring or series of fixed teeth there is a forward rotating movement imparted to said load wheel which therefore winds or hauls the chain.

Assuming there are nineteen teeth in the fixed ring of teeth and twenty teeth in the ring on the load chain wheel then each revolution of the axle will advance the said wheel one tooth thereby effecting a reduction in the speed of twenty to one.

It will be obvious that a ring of teeth similar to the teeth 24 can be formed on the left hand side of the load chain wheel shown in Figure 2 and a ring of teeth similar to 23 can be formed on the adjacent end of the casing. This arrangement of double sets of teeth effect a more even balancing of the stresses on the operative parts of the hoist.

Two or more different speed reductions can be obtained from the one machine by providing further rings of teeth within the casing and intermeshing bevel teeth upon the load chain wheel and in providing means for locking either of the first mentioned rings of teeth to the said casing (see Figure 4).

In this view both ends of the casing are open and rings of bevel teeth 23 and 23' are rotatively mounted in the ends thereof and adapted to mesh with internal bevel teeth 24 and 24' on opposite sides of the load chain wheel.

The number of teeth in one end ring is greater than the number of teeth in the other end ring and the number of the teeth 24 and 24' on opposite sides of the load chain wheel varies to correspond thereto.

The end rings of teeth 23 and 23' are rotatively mounted in the casing 10 and are retained therein by balls and ball races 42.

A flange or plate 43 is formed on or fitted to the outer faces of the end rings and the said flange or plate is formed with one or more holes or recesses to take the end of a bolt 44 slidably mounted in the casing.

The purpose of the bolt is to lock either of the rings of teeth 23 and 23' to the casing while leaving the other ring free to rotate.

The bolt can be provided with an operating knob or handle 45 which can be placed in engagement with a rack 46 on the casing to retain it in an adjusted position.

Assuming that the load chain wheel is formed with twenty teeth on one side and thirty teeth on the other side and that the teeth in the co-acting rings are one less in number it is possible to obtain two speed ratios giving twenty and thirty to one reductions.

When the bolt 44 is located in a central or neutral position both end rings of bevel teeth will be free to rotate.

In Figures 5, 6 and 7 of the drawings wherein the invention is shown as adapted to a pulley block the axle is rotated by means of a hand chain wheel 47 in lieu of the lever 26.

In this instance the casing is provided with a hook 48 for suspending the pulley block from an overhead support and the two end rings have a corresponding number of teeth which mesh with rings of teeth on both sides of the load chain wheel.

The hand chain wheel 47 is secured rigidly to the axle and carries a bell-crank pawl 49 which is adapted to engage with the teeth on the flange of the brake sleeve 35 when the direction of the said hand chain wheel is reversed.

The outer angle of the pawl 49 is formed with two flat raised faces 50 against one of which a spring 51 is adapted to bear to keep one end of the pawl in contact with the periphery of the toothed flange on the brake sleeve 17.

When the pawl is rotated on its pivot to place the second raised face against the spring it will be retained in its adjusted position and will click over the teeth on the brake sleeve when the pulley block is in operation.

The arrows shown in Figures 5 and 7 indicate the direction of rotation of the hand chain wheel and the brake pawl in position to bring the brake into operation upon the reversal of the movement of the said wheel.

When it is desired to reverse the operation of the hand chain wheel to raise or lower weights the operator pulls on a cord 52 which passes over a guide pulley 52' on the casing and is connected to a bolt 53 slidably mounted in the said casing.

The movement of the bolt 53 due to the pull on the cord 52 causes the end of the said bolt to be brought into the path of movement of the operating arm of the brake pawl 49 and forces it away from the flange of the brake sleeve thereby causing the second arm to be brought into an operative position.

The bolt 53 is returned to its normal position when the strain is removed from the cord 52 by means of a spring 54 which is fitted within a housing 55 formed in the casing.

The inner faces of the arms of the pawl 49 are provided with bevelled faces 56 which cause the bolt 53 to be returned to its normal position should the operator keep a pull on the cord while the hand chain wheel completes a revolution.

The pulley block shown in Figures 5, 6 and 7 is fitted with a compensating device for enabling the chain load wheel to be rotated freely and mesh correctly with the outer rings of teeth should there be any irregularities in the formation of the same.

The compensating device comprises an oscillating lever 57 which is pivoted centrally in a jaw 58 on the casing 10 and has its ends projecting through holes or recesses 59 formed in end plates 60 secured by screws or the like to the outer faces of the end rings of teeth 23 and 23'.

In operation the stresses set up in the gearing due to irregularly formed teeth will cause the end rings to oscillate in the casing and permit of the teeth meshing to correctly and to operate quite smoothly.

The intermeshing rings of gear teeth on both sides of the load chain wheel can be made as described with reference to Figure 4 so as to obtain different speeds in which case the compensating device is dispensed with to enable the inoperative end ring of teeth to rotate within the casing.

Alternatively a single set of gears as described with reference to Figure 2 can be employed in combination with the operating elements shown in Figures 5 to 7 to effect a required reduction of speed.

The gearing described in the foregoing specification has only one set of gears on each side of the chain load wheel but it will be obvious that two or more sets of concentrically arranged intermeshing gears can be provided to effect further reductions in speed according to any well known principle of construction.

Likewise it will be readily understood that the mounting of the load chain wheel can be utilized in gearing adapted to effect a multiplication of the driving speed.

A hoist or pulley block constructed in accordance with the invention can be easily lubricated, will operate with a minimum of friction and the parts can be easily assembled and dismantled for repairs or other purposes.

I claim:

1. In a chain hoist embodying an angularly disposed nutating or oscillating load chain wheel furnished with bevel gear teeth intermeshing with a ring of external bevel teeth, an axle passing axially through the ring of teeth and having an angularly disposed central portion passing axially through the nutating load chain wheel, ball bearings on the angularly disposed portion of the axle carrying the said load chain wheel, ball bearings for the co-axial end portions of the said axle, and means on one end of the axle for imparting rotation thereto, a reduced portion on the axle between one of the co-axial end portions and the central portion, and a locking ring and filling piece for retaining the ball bearings for the nutating or oscillating load chain wheel correctly in position on the angularly disposed portion of the axle.

2. In a chain hoist as claimed in claim 1, a fixed collar on the axle between the end portion provided with the rotation imparting means and the angularly disposed portion coacting with the locking ring to confine the load chain wheel on the axle.

3. In a chain hoist, a nutating or oscillating load chain wheel having gear teeth meshing with a ring of gear teeth, an axle having co-axial end portions and an angularly disposed central portion adapted to support the nutating or oscillating wheel, a brake sleeve concentrically disposed within the ring of gear teeth, an antifrictional bearing within the brake sleeve for one of the end portions of the axle, and means for locking the brake sleeve to the axle when the latter is rotated in one direction and for permitting independent rotation of the axle in the opposite direction.

4. A chain hoist as claimed in claim 3 in which means are provided for retaining the brake sleeve within the ring of bevel teeth, said locking means including a spring actuated reversible pawl carried by a driving member and engaging with teeth provided on the said brake sleeve.

5. In a chain hoist, a nutating or oscillating lead chain wheel having gear teeth meshing with a ring of gear teeth, an axle having co-axial end portions and an angularly disposed central portion adapted to support the nutating or oscillating wheel, a rotatably mounted brake sleeve concentrically disposed within the ring of gear teeth, an anti-frictional bearing within the brake sleeve for one end portion of the axle, means for locking the brake sleeve to the axle when the latter is rotated in one direction and for permitting rotation of the axle in the opposite direction, said means including an operating member connected to one end of the axle, a reversible pawl pivoted to the operating member and adapted to engage with the teeth of the brake sleeve, and a spring attached to the operating member and detachably engaging the outer end of said reversible pawl.

6. A chain hoist including a casing, a ring of external bevel gear teeth mounted rotatively in each end of the casing, a brake sleeve mounted concentrically within one ring of bevel gear teeth, an axle mounted in ball bearings supported by the brake sleeve and the ring of bevel gear teeth in the opposite end of the casing, an angularly disposed portion on the axle between the rings of bevel gear teeth, a nutating load wheel mounted revolvably on the angularly disposed portion of the axle, rings of internal bevel gear teeth on opposite sides of the load wheel and meshing with the rings of external bevel gear teeth, a hand chain wheel on the axle for imparting rotation thereto, a lever oscillatingly supported on the casing, and loose connections between the ends of the lever and the rings of external bevel gear teeth substantially as described.

7. A chain hoist including a casing, a ring of external gear teeth mounted rotatively in each end thereof, a brake sleeve mounted concentrically within one ring of bevel gear teeth, an axle mounted in ball bearings supported by the brake sleeve and the ring of bevel gear teeth in the opposite end of the casing, an angularly disposed portion on the axle between the rings of bevel gear teeth, a nutating load wheel mounted revolvably on the angularly disposed portion of the axle, rings of internal bevel gear teeth on opposite sides of the load wheel meshing with the rings of external bevel gear teeth, a hand chain wheel on the axle for imparting rotation thereto, a lever oscillatingly supported on the casing, loose connections between the ends of the lever and the rings of external bevel gear teeth, a flange on the outer end of the brake sleeve, radially disposed teeth on the flange, a reversible pawl pivoted to the inside of the hand chain wheel and having angularly disposed arms, a spring adapted to maintain either of the arms in engagement with the teeth on the flange, and means for tripping the pawl to bring the other arm into engagement with the teeth on the said flange, substantially as described.

8. A chain hoist including a casing, a ring of external bevel gear teeth mounted rotatively in each end thereof, a brake sleeve mounted concentrically within one ring of bevel gear teeth, an axle mounted in ball bearings supported by the brake sleeve and the ring of bevel gear teeth in the opposite end of the casing, an angularly disposed portion on the axle between the rings of bevel gear teeth, a nutating load wheel mounted revolvably on the angularly disposed portion of the axle, rings of internal bevel gear teeth on opposite sides of the load wheel and meshing with the rings of external bevel gear teeth, a hand chain wheel on the axle, a lever oscillatingly supported on the casing, loose connections between the ends of the lever and the rings of external bevel gear teeth, a flange on the outer end of the brake sleeve, radially disposed teeth on the flange, a reversible pawl pivoted to the inside of the hand chain wheel and having angularly disposed arms, a spring adapted to maintain either of the arms in engagement with the teeth on the flange, a sliding bolt on the casing, a guide pulley on the casing, a flexible member connected to one end of the bolt and passing around the guide pulley, a spring for returning the bolt to its normal position, and bevelled faces on the arms of the pawls, substantially as described.

In testimony whereof he has affixed his signature.

ALFRED ARTHUR QUICK.